(12) United States Patent
Katagawa et al.

(10) Patent No.: US 8,988,550 B2
(45) Date of Patent: Mar. 24, 2015

(54) IMAGE-PICKUP APPARATUS AND METHOD OF CONTROLLING THE SAME

(75) Inventors: Hiroyasu Katagawa, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/360,113

(22) Filed: Jan. 27, 2012

(65) Prior Publication Data
US 2012/0200735 A1  Aug. 9, 2012

(30) Foreign Application Priority Data

Feb. 9, 2011  (JP) ................... 2011-025687

(51) Int. Cl.
H04N 9/73 (2006.01)
H04N 5/225 (2006.01)
H04N 5/235 (2006.01)

(52) U.S. Cl.
CPC ........... *H04N 5/2254* (2013.01); *H04N 5/2357* (2013.01)
USPC ...................................................... 348/226.1

(58) Field of Classification Search
CPC .................................................. H04N 5/2357
USPC .............................................. 348/226.1, 345
See application file for complete search history.

(56) References Cited

U.S. PATENT DOCUMENTS

| | | | |
|---|---|---|---|
| 2006/0055813 A1* | 3/2006 | Nakata et al. | 348/345 |
| 2009/0067828 A1* | 3/2009 | Ono et al. | 396/128 |
| 2009/0148147 A1* | 6/2009 | Fujii et al. | 396/128 |
| 2012/0026358 A1* | 2/2012 | Hirose | 348/226.1 |

FOREIGN PATENT DOCUMENTS

| | | |
|---|---|---|
| JP | 2000-156823 | 6/2000 |
| JP | 2007-282107 A | 10/2007 |
| JP | 2008-092334 | 4/2008 |
| JP | 2008-109370 | 5/2008 |
| JP | 2009-017213 | 1/2009 |
| JP | 2010-078856 | 4/2010 |
| JP | 2010-166236 A | 7/2010 |

OTHER PUBLICATIONS

The above foreign patent documents were cited in a Jan. 6, 2015 Japanese Office Action, a copy of which is enclosed without an English Translation, that issued in Japanese Patent Application No. 2011-025687.

* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

An image-pickup apparatus includes an image-pickup element including a plurality of image-pickup pixels configured to photoelectrically convert light from an image-pickup lens and to generate an image of an object, and a plurality of focus detection pixels each configured to receive light which has passed through an area of a part of an exit pupil of the image-pickup lens, a flicker correction value generator configured to generate a flicker correction value for correcting a flicker in an image signal output from the image-pickup pixels, and a flicker corrector configured to correct a flicker in a focus detection signal output from the focus detection pixels based on the flicker correction value.

4 Claims, 8 Drawing Sheets

| R | G | R | G | R | G | R | G | R | G |
|---|---|---|---|---|---|---|---|---|---|
| G | B | G | B | G | B | G | B | G | B |
| R | S | R | G | R | G | R | S | R | G |
| G | B | S | B | G | B | G | B | S | B |
| R | G | R | G | R | G | R | G | R | G |
| G | B | G | B | G | B | G | B | G | B |
| R | S | R | G | R | G | R | S | R | G |
| G | B | S | B | G | B | G | B | S | B |
| R | G | R | G | R | G | R | G | R | G |
| G | B | G | B | G | B | G | B | G | B |

FIG. 4

IMAGE-PICKUP APPARATUS AND METHOD OF CONTROLLING THE SAME

BACKGROUND OF THE INVENTION

1. Field of the Invention

The present invention relates to an image-pickup apparatus and a method of controlling the same.

2. Description of the Related Art

Recently, solid-state image pickup apparatuses are quite popular, each of which uses a solid-state image pickup element, such as a CCD image sensor or a CMOS image sensor. The solid-state image pickup element is applied to a digital still camera, a digital video camera, or the like, and is widely used.

It is known that a phenomenon so called a "fluorescent light flicker" occurs when an object is taken as a moving image under an illumination of a fluorescent lamp by the image-pickup apparatus, such as the digital still camera and the digital video camera. For example, when an image is taken by an image-pickup element having a rolling shutter characteristic under the illumination of the fluorescent lamp directly lit by a commercial alternating current (AC) power, a luminance flicker, so called a "fluorescent light flicker", may occur in a time direction in each image. This is a phenomenon in which periodical bright and dark patterns occur in an image signal taken in the image-pickup apparatus due to a difference between a frequency twice as much as that of the commercial alternating current power and a vertical synchronizing frequency of the image-pickup apparatus because the fluorescent lamp, as a light source, changes with the frequency twice as much as that of the commercial alternating current power.

Therefore, in order to solve the problem, many method of removing the flicker are proposed, and Japanese Patent Laid-Open No. 2009-17213 obtains a vertical intensity distribution by integrating an output of the CMOS image sensor in a horizontal direction, and calculates a flicker component in a vertical direction in a present frame on the basis of the vertical intensity distribution in a plurality of frames. An original image (taken image before the correction) is corrected by calculating a flicker correction value from the calculated flicker component and by multiplying a video signal of the present frame by the correction coefficient.

In addition, a hue change (color flicker) of an image may occur when only a luminance signal is corrected because, in general, a constituent ratio among R (red), G (green), and B (blue) in the illuminating light of the fluorescent lamp slightly changes according to the luminance of a illumination. Accordingly, Japanese Patent Laid-Open No. 2008-109370 proposes a method of separately correcting R, G, and B flickers instead of correcting only the luminance signal.

Japanese Patent Laid-Open No. 2008-92334 indicates a ratio among R, G, and B, which are color elements of the fluorescent lamp, and points out that a color flicker occurs when a high-speed shutter is used.

A part of an image-pickup area of an image-pickup element may be used as a function other than taking images. Japanese Patent Laid-Open No. 2000-156823 discloses an image-pickup apparatus configured to have a focus detection function by using an image-pickup element including both of a normal pixel (image-pickup pixel) and a focus detection pixel that performs a pupil divide by providing a light-shielding layer between a microlens and a photodiode.

Japanese Patent Laid-Open No. 2000-156823 gathers signals only from focus detection pixels, which are pupil-divided into right and left or up and down, forms two line images which are pupil-divided, and calculates a defocus amount based on a shift amount between the images.

The shift amount between projection positions of the images which are pupil-divided with a certain defocus amount can be determined by the base length between the two divided pupils. The shift amount becomes larger as the base length becomes longer, and the accuracy of the focus detection improves.

In an image-pickup element including both of the focus detection pixel and the image-pickup pixel, the above-mentioned fluorescent light flicker affects the focus detection pixel by its characteristic, and the bright and dark patterns occur. Since the fluorescent light flicker causes an uneven luminance in the vertical direction, the bright and dark pattern occurs in two line images pupil-divided by gathering the signals from the vertically pupil-divided focus detection pixels, and therefore the shift amount between the images cannot be calculated accurately. Accordingly, the defocus amount cannot be calculated accurately.

Since the number of focus detection pixels is less than that of image-pickup pixels or the focus detection pixels are arranged around the center, the flicker cannot be detected simply with the focus detection pixels in the conventional flicker detection method.

As described in Japanese Patent Laid-Open No. 2010-78856, the focus detection signal of the focus detection pixel is not used for an image generation, and therefore a filter of a transparent (white) film may be arranged instead of R, G, and B color filters.

SUMMARY OF THE INVENTION

The present invention provides an image-pickup apparatus configured to perform a flicker correction for a focus detection pixel and to calculate an accurate defocus amount.

An image-pickup apparatus as one aspect of the present invention includes an image-pickup element including a plurality of image-pickup pixels configured to photoelectrically convert light from an image-pickup lens and to generate an image of an object, and a plurality of focus detection pixels each configured to receive light which has passed through an area of a part of an exit pupil of the image-pickup lens, a flicker correction value generator configured to generate a flicker correction value for correcting a flicker in an image signal output from the image-pickup pixels, and a flicker corrector configured to correct a flicker in a focus detection signal output from the focus detection pixels based on the flicker correction value.

Further features and aspects of the present invention will become apparent from the following description of exemplary embodiments with reference to the attached drawings.

BRIEF DESCRIPTION OF THE DRAWINGS

FIG. 4 is an arrangement diagram of an image-pickup element including both of a focus detection pixel and an image-pickup pixel.

DESCRIPTION OF THE PREFERRED EMBODIMENTS

Figure 1:
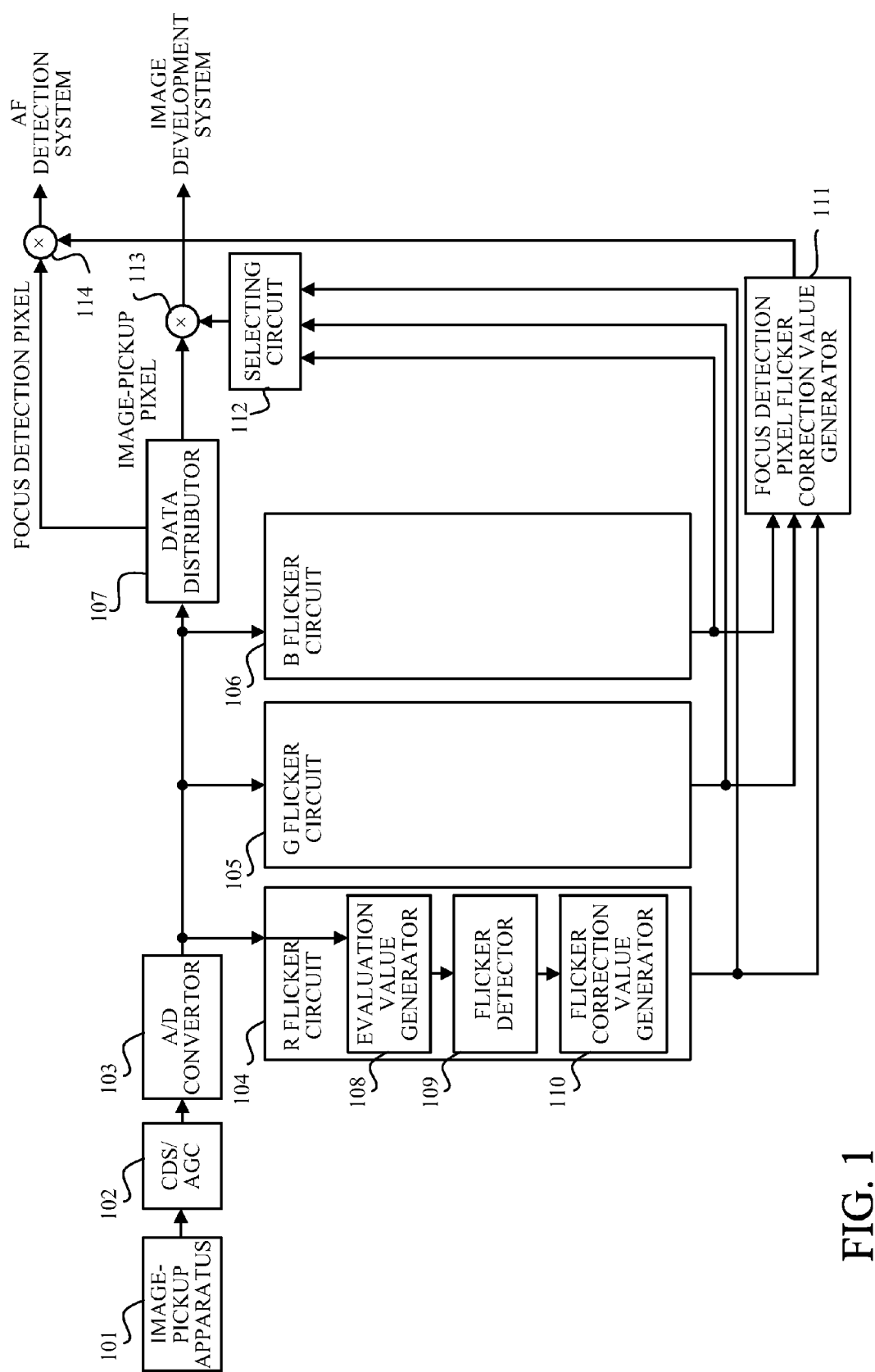
FIG. 1 is a diagram that illustrates a configuration of an image-pickup apparatus in first embodiment of the present invention.

Hereinafter, preferred embodiments of the present invention will be described in reference to the drawing.

First Embodiment

FIG. 1 is a diagram that illustrates a configuration of an image-pickup apparatus in first embodiment of the present invention.

An image-pickup element 101 converts a light from an image-pickup lens (not illustrated) into an electrical signal when taking an object image and outputs the electric signal. A CDS (Correlation Double Sampling)/AGC (Auto Gain Control) 102 is a processor configured to improve the S/N ratio in an analog electrical signal. An A/D convertor 103 converts the image-pickup electrical signal into digital image-pickup data (image signal and focus detection signal).

Flicker circuits 104, 105 and 106 for R, G and B calculate a correction gain of a flicker by using the converted digital image signal.

The principle of the occurrence of a fluorescent light flicker will be described in reference to FIG. 3.

Figure 3:
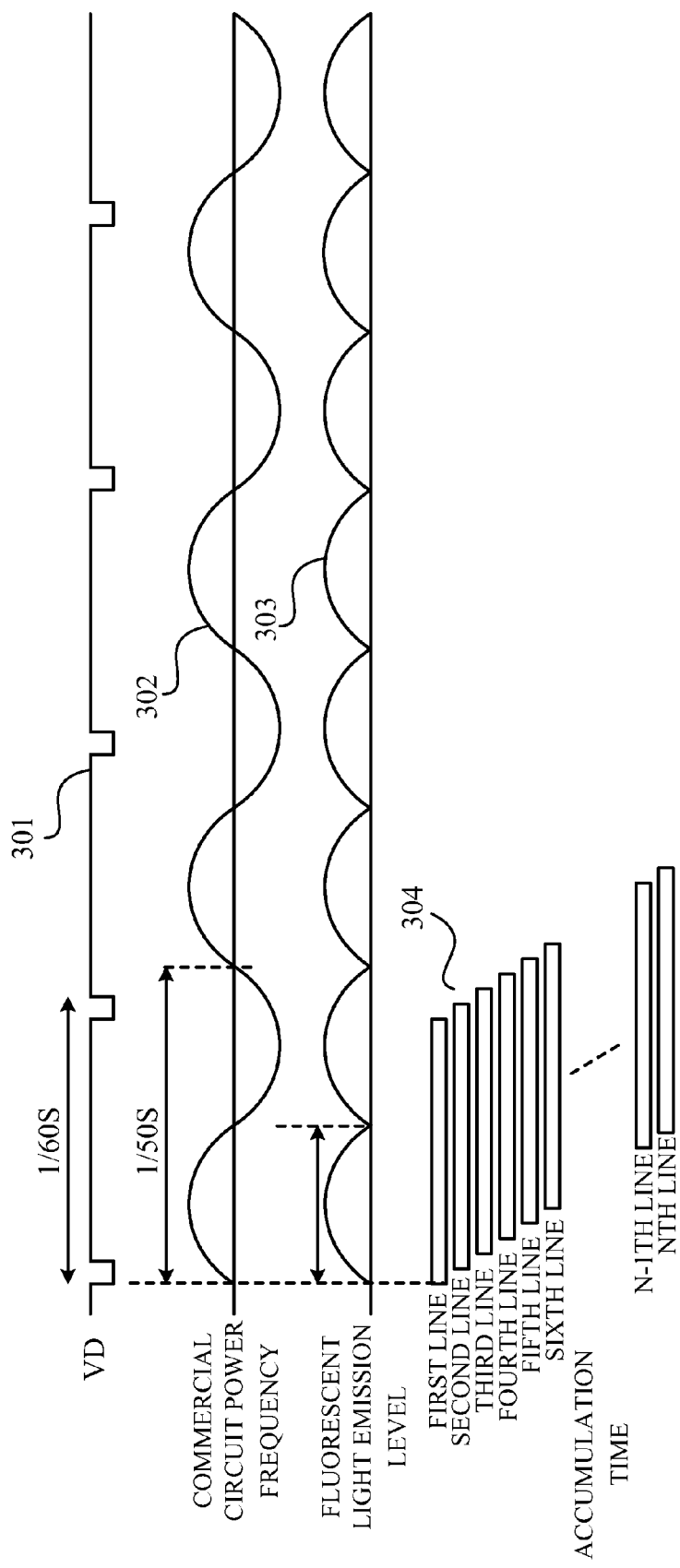
FIG. 3 is a diagram that illustrates the principle of the occurrence of a fluorescent light flicker.

FIG. 3 illustrates a frame format of an aspect of charge accumulations in an image-pickup element in the time direction when the image-pickup apparatus using a CMOS image sensor takes an object as a moving image under the fluorescent light illumination of a region where a commercial alternating current power frequency is 50 Hz. FIG. 3 illustrates a vertical synchronizing signal VD 301 that is determined by an image-pickup method of the image-pickup apparatus and a commercial alternating current power frequency 302, for example 1/60 s, that is determined in each of the countries or regions of the world. FIG. 3 illustrates a frequency of light emission 303 of a light emitter that emits fluorescent light according to the commercial alternating current power frequency 302.

A charge accumulation time period on the CMOS image sensor is the same as a time period (1/60 s) of a frequency of the vertical synchronizing signal VD.

In the CMOS image sensor, an exposure timing 304 of each line is sequentially controlled, and the start and end timings of the charge accumulation is different in each line. Moreover, the light emitting frequency of the fluorescent lamp in the charge accumulation time is different from the frequency of the vertical synchronizing signal VD. Therefore, when a mono-color plain surface is imaged, an accumulated charge amount is different between the first line and the second line. The accumulated charge amount obtained from light receiving during the charge accumulation time is different in each line even in the same frame, and therefore the fluorescent light flicker Occurs.

FIG. 4 illustrates an illustrative arrangement diagram of an image-pickup element including both of focus detection pixels and image-pickup pixels.

As illustrated in FIG. 4, a color filter or a focus-detecting light-shield film is configured on the image-pickup element. "R" denotes an image-pickup pixel having a red color filter, "G" denotes an image-pickup pixel having a green color filter, "B" denotes an image-pickup pixel having a blue color filter, and "S" denotes an image-pickup pixel having a transparent (white) filter. Each focus detection pixel receives light through an area of a part of an exit pupil of an image-pickup lens (not illustrated).

The flicker circuits 104, 105 and 106 are configured to remove flickers, where the G and B flicker circuits 105 and 106 are different in a pixel color from and are similar in an internal circuit configuration to the R flicker circuit 104. Therefore, a description will be given of the R flicker circuit 104, and a description of the G and B flicker circuits 105 and 106 will be omitted.

Figure 6:
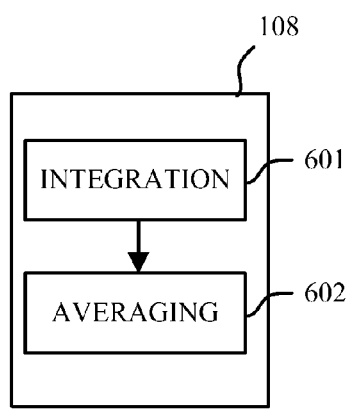
FIG. 6 is a diagram that illustrates a circuit configuration of an evaluation value generator.

The R flicker circuit 104 corresponds to the R pixels and uses data of only the R pixels. First, an evaluation value generator 108 generates data used for detection by using input R pixel data. FIG. 6 illustrates an internal circuit configuration of the evaluation value generator 108. In FIG. 6, an integration circuit 601 divides an image signal into a plurality of areas in the vertical and the horizontal directions and integrates the image signal for each area.

Second, an averaging (normalizing) circuit 602 averages (normalizes) an integrated value made by the integration circuit 601 and outputs the result to a flicker detector 109.

Figure 7:
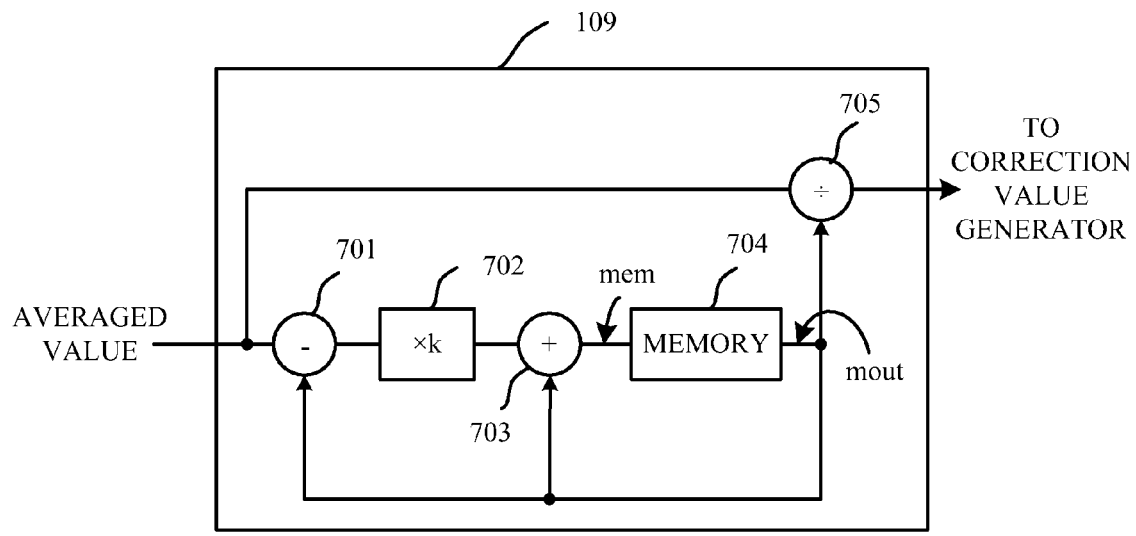
FIG. 7 is a diagram that illustrates a circuit configuration of a flicker detector.

An example method of calculating a flicker component in each detection frame in the flicker detector 109 will be described in reference to FIG. 7.

A subtracter 701, a multiplier 702, an accumulator 703, and a memory 704 perform a calculation in the following expression to form so-called a "cyclic low-pass filter".

$$\text{mem} = \text{ave} \times k + \text{mout} \times (1-k) \qquad \text{[EXPRESSION 1]}$$

Herein, "ave" denotes a value generated by the evaluation value generator 108, "mout" denotes an output from the memory 704, "mem" denotes an output from the accumulator 703 and its value is newly stored in the memory 704, and "K" denotes a filter coefficient of the cyclic low-pass filter.

The divider 705 calculates and outputs as a flicker component a luminance variation component caused by the frequency of light emission of the fluorescent lamp by dividing the "ave" by an output from the memory 704. Next, a flicker correction value generator 110 generates a flicker correction value by calculating a reciprocal of the flicker component obtained from the flicker detector 109.

The G and B flicker circuits 105 and 106 also generates the flicker correction values similarly to the R flicker circuit 104.

The image-pickup element, in general, has a spectral sensitivity distribution. When the image-pickup element includes a transparent (white) film in addition to R, G, and B films, the spectral transmission characteristics of the R, G, B and white filters for a normal flicker light source will be, for example, as illustrated in FIG. 8.

Figure 8:
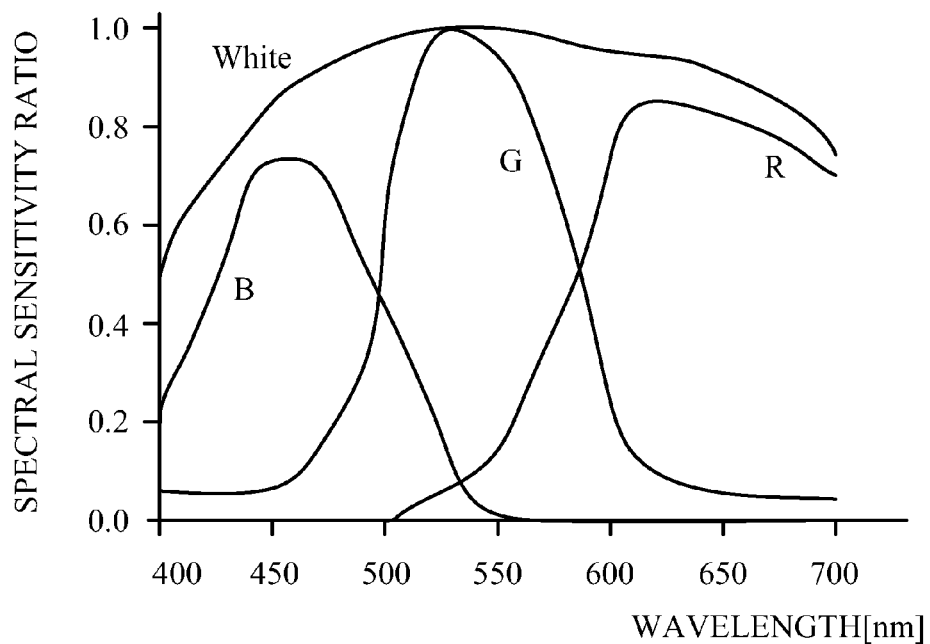
FIG. 8 is a diagram that illustrates a spectral sensitivity of R, G, B and white in a normal flicker light source.

As illustrated in FIG. 8, the spectral transmission characteristics are different among R, G, B and white colors. Therefore, when the flicker correction value for the focus detection pixel is calculated by using R, G and B flicker correction values that are calculated from the image-pickup pixel, the above-mentioned spectral transmission characteristics may be considered as described below.

A focus detection pixel flicker correction value generator 111 (flicker correction value generator) calculates a focus detection flicker correction gain from the flicker correction values for R, G and B colors, which are calculated above, and the characteristic of a filter of the transparent (white) film located in the focus detection pixel. An example for the focus detection flicker correction gain will be described below.

A flicker correction value Sg for the focus detection pixel is calculated from the spectral sensitivity of the transparent (white) film in the normal flicker light source, illustrated in FIG. 8.

The transparent (white) film allows all wavelengths to pass through, but has a low spectral sensitivity ratio for wavelengths near 400-500 nm, which depends upon the spectral sensitivity characteristic of B. Moreover, the transparent (white) film has a high spectral sensitivity ratio for wavelengths near 500-600 nm, which depends on the spectral sensitivity characteristic of G. That is, the spectral sensitivity ratio of the transparent (white) film depends upon the spectral sensitivity characteristic of each of R, G, and B; therefore the areas of the spectral sensitivity of each of R, G, and B are integrated, and the flicker correction value Sg for the focus detection pixel can be calculated from a ratio of the integrated values.

The ratio of the integrated values of R, G and B in FIG. 8 is about as follows:

$$R:G:B \approx 3:5:2 \quad \text{[EXPRESSION 2]}$$

Accordingly, when the flicker correction values for R, G and B are respectively represented as Rg, Gg and Bg, the flicker correction value Sg for the focus detection pixel to be calculated will be described as the following expression:

$$Sg \approx (3 \times Rg + 5 \times Gg + 2 \times Bg)/10 \quad \text{[EXPRESSION 3]}$$

Figure 10:
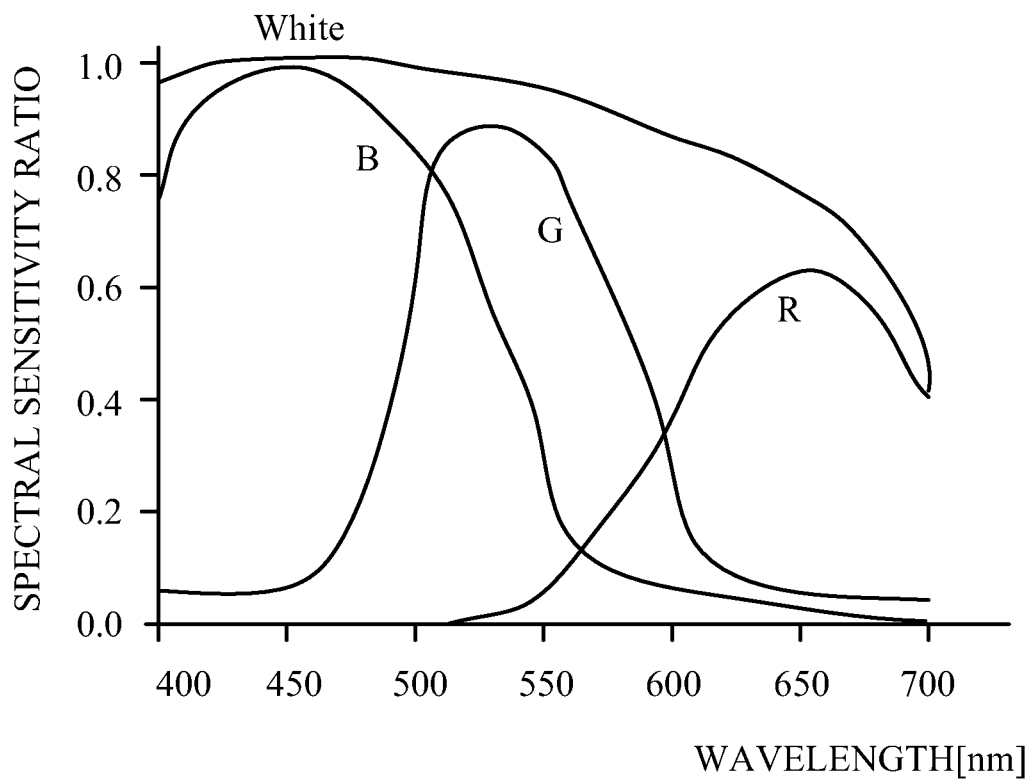
FIG. 10 is a diagram that illustrates a spectral sensitivity of R, G, B and white in a blue flicker light source.

Moreover, FIG. 10 is an example of a diagram that illustrates the spectral sensitivity under a blue normal flicker light source rather than a normal flicker light source. When the area of the spectral sensitivity of each R, G and B are integrated, the ratio of the integrated values for R, G and B is about as follows:

$$R:G:B \approx 2:3:5 \quad \text{[EXPRESSION 4]}$$

Accordingly, when the flicker correction values for R, G, and B are respectively represented as Rg, Gg and Bg, the flicker correction value Sg for the focus detection pixel to be calculated is described as the following expression:

$$Sg \approx (2 \times Rg + 3 \times Gg + 5 \times Bg)/10 \quad \text{[EXPRESSION 5]}$$

As described above, it is necessary to change the ratio of the flicker correction values for R, G, and B by the spectral sensitivity of the flicker light source.

Figure 9:
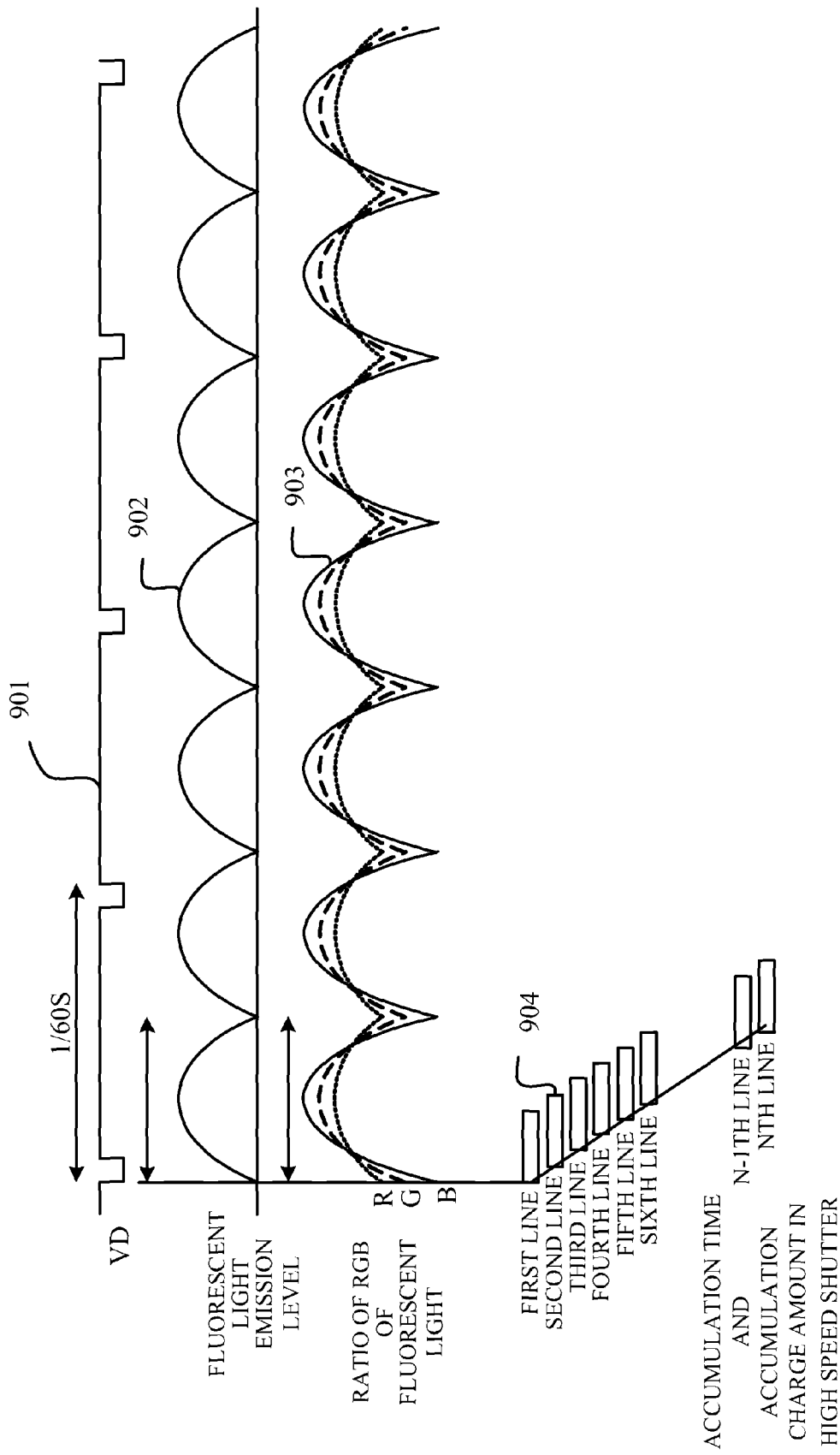
FIG. 9 is a diagram that illustrates an accumulation time and an accumulated charge amount of each line in high speed shutter.

FIG. 9 illustrates an accumulation time and an accumulated charge amount when the high-speed shutter is used.

FIG. 9 illustrates a vertical synchronizing signal VD 901 that is determined by the image-pickup method of the image-pickup apparatus and a frequency of light emission 902 of a light emitter that emits fluorescent light according to the frequency of the commercial current power. FIG. 9 illustrates a ratio 903 among R, G and B, which are color components of the fluorescent lamp.

FIG. 9 illustrates the accumulation time and the accumulated charge amount in each line when the high-speed shutter is used as 904.

As illustrated in FIGS. 3 and 9, when the accumulation time is long, a flicker that occurs in the image signal is approximate to a sine wave of the frequency of light emission of a blink light source. On the other hand, when the accumulation time is short, the flicker that occurs in the image signal approaches a trace of the frequency of light emission of the blink light source. Therefore, it is difficult to approximate the flicker that occurs, by a simple sine wave, and the flicker comes to include a high harmonic component.

The flicker correction includes the high harmonic component particularly in the G color, and the flicker correction value for G may be more weighted in the above-described expression of the flicker correction value Sg for the focus detection pixel.

This embodiment is a mere example, and the flicker correction value for the focus detection pixel is calculated from the flicker correction value for each color and the characteristic of the transparent (white) filter.

After the flicker correction values for R, G, and B and the flicker correction value for the focus detection pixel are calculated, a data distributor 107 distributes the data to the image-pickup pixel and the focus detection pixel.

In each image-pickup pixel, after image signals output from the RGB pixels are input, the flicker correction values for R, G, and B are allocated in a selecting circuit 112, and are multiplied in the multiplier 113 to perform the flicker correction. The flicker correction value for the focus detection pixel is multiplied by a focus detection signal output from the focus detection pixel in the multiplier 114 (flicker corrector) to perform the flicker correction.

As described above, the flicker correction values for R, G, and B are calculated, and on the basis of the calculated values and the characteristic of the transparent (white) filter arranged in the focus detection pixel, the flicker correction value for the focus detection pixel is calculated. An accurate defocus amount can be calculated by correcting the flicker in the focus detection signal output from the focus detection pixel and in the image signal output from the image-pickup pixel.

Figure 5:
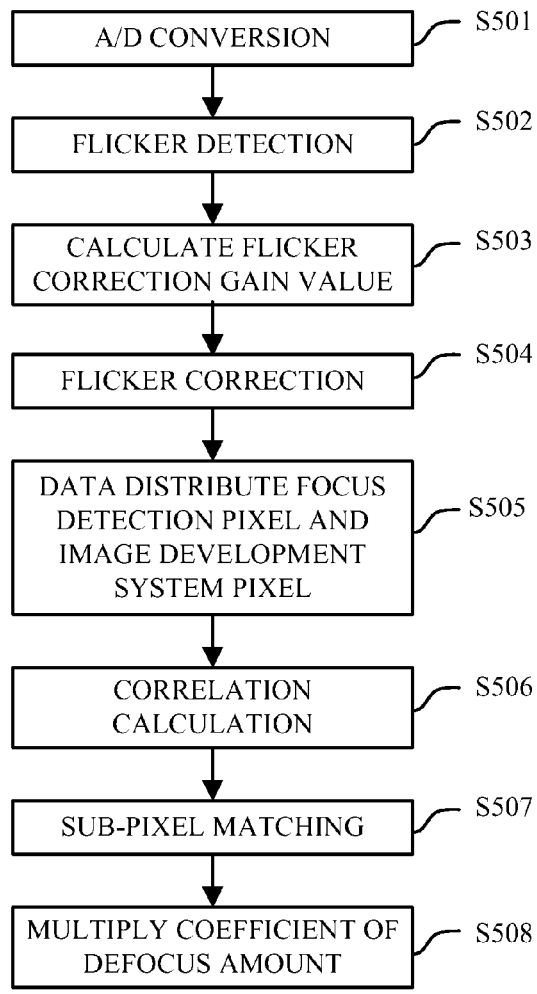
FIG. 5 is a procedural flow of correcting a flicker and of calculating a defocus amount.

FIG. 5 illustrates, as a flowchart, a calculational procedure of the flicker correction and the defocus amount.

In S501, the A/D convertor converts the image-pickup electrical signal into the digital image signal and the focus detection signal.

In S502, the flicker detection is performed using the digital image signal and the flicker for each of R, G and B is detected.

In S503, the flicker correction value for each of R, G, and B is calculated and the flicker correction value for the focus detection pixel is also calculated.

In S504, the flicker correction is performed for each of the image-pickup pixel and the focus detection pixel.

In S505, the image-pickup data where the flicker correction has been performed is distributed to the image-pickup pixel and the focus detection pixel. Next, a correlation calculation is performed in S506.

More specifically, a processing for overlapping two images and for calculating a sum of absolute values of differences between them is performed while the overlapping position is changed, and a position that provides the smallest absolute value of the difference is obtained. Next, in S507, sub-pixel matching is performed using a so-called "parabola fitting" method on the basis of values around the position that provides the smallest absolute value of the difference. As a result, the accuracy of the shift amount of the image improves.

Finally, in S508, the defocus amount is obtained by multiplying the image shift amount by a predetermined coefficient that is defined by the base length.

According to the present invention, before the defocus amount is calculated, the flicker correction value for the focus detection pixel is calculated on the basis of the flicker correction value for each color that is calculated from the image signal output from the image-pickup pixel and the characteristic of the transparent (white) filter that is arranged in the focus detection pixel. The uneven luminance in the vertical direction is prevented by correcting the flicker in the focus detection signal output from the focus detection pixel, which includes the flicker component, by using the correction value, and as a result the defocus amount can be calculated with high accuracy.

Second Embodiment

Figure 2:
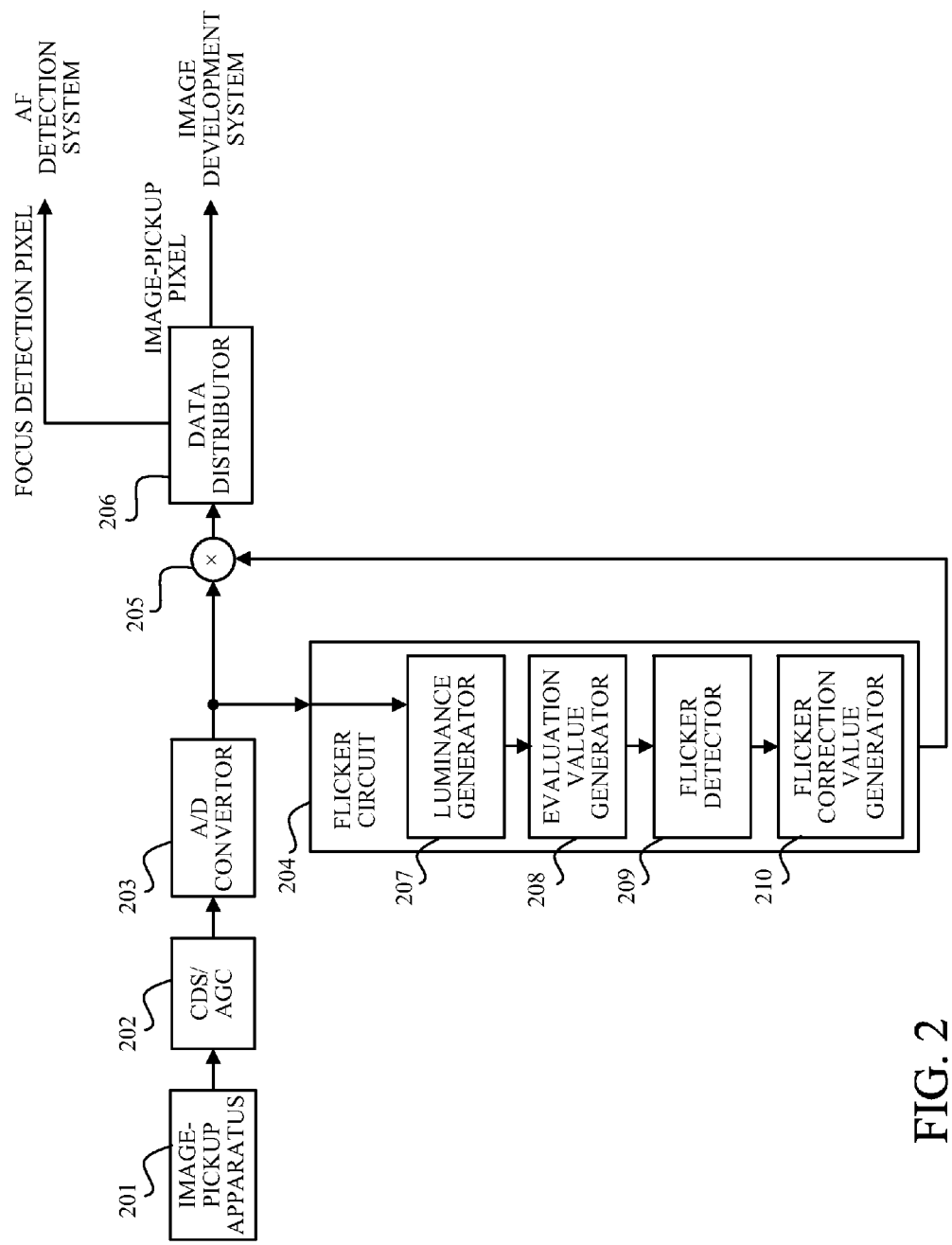
FIG. 2 is a diagram that illustrates a configuration of an image-pickup apparatus in second embodiment of the present invention.

FIG. 2 illustrates a configuration of an image-pickup apparatus in second embodiment of the present invention.

The second embodiment contributes to the reduction of the flicker circuit size. When the high-speed shutter is not used, the variation of a charge accumulation amount for colors of the illumination light of the fluorescent light decreases, and therefore the flicker correction value can be calculated only by one flicker circuit. In this case, a correction gain value is calculated by generating a luminance Y from the RGB pixels and the correction gain value is applied to both of the image-pickup pixel and the focus detection pixel.

The image-pickup element 201, when an object is taken, converts optical information into an electrical signal by the photoelectrical conversion and outputs the electric signal. A CDS (Correlation Double Sampling)/AGC (Auto Gain Control) 202 is a processor configured to improve the S/N ratio in an analog electrical signal. An A/D convertor 203 converts an image-pickup electrical signal into digital image-pickup data (image signal and focus detection signal).

The flicker circuit 204 calculates a correction gain of a flicker by using the image signal converted in the A/D converter. First, a luminance generator 207 generates the luminance Y from the image signals output from the RGB image-pickup pixels. The luminance Y is calculated by the following expression:

$$Y \approx 0.299R + 0.587G + 0.114B \quad \text{[EXPRESSION 6]}$$

The luminance Y is generated by the above expression, and is output to an evaluation value generator 208.

Next, the evaluation value generator 208 generates data used for detection by using the input luminance Y. The evaluation value generator 208, as well as first embodiment illustrated in FIG. 6, divides the image signal into a plurality of areas in the vertical direction and the horizontal direction and integrates it for each area by a integration circuit 601. An averaging (normalizing) circuit 602 averages or normalizes the integrated value made by the integration circuit 601 and outputs it to a flicker detector 209.

The flicker detector 209 and the flicker correction value generator 210 have the same configurations as those of first embodiment, and an explanation thereof will be omitted.

The calculated flicker correction value is multiplied by the image-pickup data in a multiplier 205 to perform the flicker correction.

Subsequently, a data distributor 206 distributes data to the focus detection pixel and the image-pickup pixel, and the correlation calculation is performed using the focus detection pixels, and as a result an accurate defocus amount can be calculated.

As described above, such a circuit configuration can reduce the circuit size or the calculation amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-025687, filed on Feb. 9, 2011 which is hereby incorporated by reference herein in its entirety.

What is claimed is:

1. An image-pickup apparatus comprising:
   an image-pickup element including a plurality of image-pickup pixels configured to photoelectrically convert light from an image-pickup lens and to generate an image of an object, and a plurality of focus detection pixels each configured to receive light which has passed through an area of a part of an exit pupil of the image-pickup lens;
   a flicker correction value generator configured to generate a flicker correction value for correcting a flicker in an image signal output from the image-pickup pixels; and
   a flicker corrector configured to correct a flicker in a focus detection signal output from the focus detection pixels based on the flicker correction value,
   wherein the flicker correction value generator generates a first flicker correction value for each color of the image-pickup pixels including color filters and a second flicker correction value based on the first flicker correction value and a characteristic of a filter included in the focus detection pixels, and
   wherein the flicker corrector corrects the flicker in the focus detection signal output from the focus detection pixels by using the second flicker correction value.

2. The image-pickup apparatus according to claim 1, wherein the flicker corrector corrects the flicker in the flicker detection signal output from the focus detection pixels before a correlation calculation using the focus detection pixels is performed.

3. The image-pickup apparatus according to claim 1, wherein the filter included in the focus detection pixels is a transparent filter.

4. A method for controlling an image-pickup apparatus comprising the steps of:
   photoelectrically converting light from an image-pickup lens and generating an image of an object using a plurality of image-pickup pixels;
   receiving light that has passed through a part of an area of an exit pupil of the image-pickup lens using each of a plurality of focus detection pixels;
   generating a flicker correction value for correcting a flicker in an image signal output from the image-pickup pixels; and
   correcting a flicker in a focus detection signal output from the focus detection pixels on the basis of the flicker correction value,
   wherein the generating step generates a first flicker correction value for each color of the image-pickup pixels including color filters and a second flicker correction value based on the first flicker correction value and a characteristic of a filter included in the focus detection pixels, and
   wherein the correcting step corrects the flicker in the focus detection signal output from the focus detection pixels by using the second flicker correction value.

* * * * *